United States Patent
Bennett et al.

(10) Patent No.: US 6,809,813 B2
(45) Date of Patent: Oct. 26, 2004

(54) SPECTROSCOPIC PROBE

(75) Inventors: Robert Bennett, Nympsfield (GB); Brian J E Smith, Bristol (GB)

(73) Assignee: Renishaw PLC, Gloucestershire (GB)

( * ) Notice: Subject to any disclaimer, the term of this patent is extended or adjusted under 35 U.S.C. 154(b) by 406 days.

(21) Appl. No.: 09/936,305
(22) PCT Filed: Jan. 18, 2001
(86) PCT No.: PCT/GB01/00170
§ 371 (c)(1), (2), (4) Date: Sep. 12, 2001
(87) PCT Pub. No.: WO01/53865
PCT Pub. Date: Jul. 26, 2001

(65) Prior Publication Data
US 2002/0159055 A1 Oct. 31, 2002

(30) Foreign Application Priority Data
Jan. 18, 2000 (GB) .............................................. 0000954

(51) Int. Cl.[7] .......................... G01N 21/64; G01N 21/65
(52) U.S. Cl. ...................... 356/301; 356/318; 356/417; 250/458.1; 359/634
(58) Field of Search ................................ 356/301, 317, 356/318, 417; 250/458.1, 459.1, 461.1, 461.2; 385/31, 46, 51; 359/351, 629, 634, 636, 618

(56) References Cited

U.S. PATENT DOCUMENTS

| 5,112,127 A | 5/1992 | Carrabba et al. ............ 356/301 |
| 5,377,004 A | 12/1994 | Owen et al. ................. 356/301 |
| 5,755,510 A | 5/1998 | Hernandez et al. ......... 374/121 |

FOREIGN PATENT DOCUMENTS

| DE | 35 45 082 A | 5/1987 |
| JP | A 3-259730 | 11/1991 |

Primary Examiner—F. L. Evans
(74) Attorney, Agent, or Firm—Oliff & Berridge, PLC

(57) ABSTRACT

A spectroscopic probe includes a monolithic block (10) of transparent material and GRIN lenses (20, 22, 24). Light for illuminating a sample is delivered by an optical fiber (31), and light scattered by the sample is output by an optical fiber (33). The block (10) has opposing angled faces (12A, 12B), coated with a dichroic filter coating and a reflective coating respectively. A method for making blocks (10) is also disclosed, in which the coatings are first provided on a large sheet, and blocks (10) are then cut from the sheet using angled cuts. Since the coated block reduces the number of components required, the probe can be miniaturized, e.g. for use in an endoscope.

17 Claims, 1 Drawing Sheet

SPECTROSCOPIC PROBE

FIELD OF THE INVENTION

This invention relates to a probe for use in spectroscopy, for example Raman or fluorescence spectroscopy. It also relates to a method of manufacturing a component of such a probe.

DESCRIPTION OF PRIOR ART

Probes for spectroscopic use are known from, for example, U.S. Pat. No. 5,112,127 (Carrabba et al) and U.S. Pat. No. 5,377,004 (Owen et al).

The probes shown in those patents are supplied with laser light via an optical fibre, and the laser light is focused by a lens onto a sample. Resulting scattered light, e.g. Raman scattered light or fluorescence at different wavelengths from the laser, is collected by the lens and fed to a second optical fibre, which takes it to a spectroscopic device for analysis. In the Carrabba patent, the scattered light is folded out of the path of the illuminating laser beam within the probe by a beamsplitter. The Owen patent describes an inverse arrangement, in which the scattered light passes in a straight line through the beamsplitter. The beamsplitter acts to fold the illuminating laser light into this beam path, towards the sample.

In both the Carrabba and Owen patents, the beamsplitter is a dichroic filter. This has several advantages. Firstly, a dichroic filter reflects and transmits the various wavelengths more efficiently than a conventional beamsplitter. Secondly, it rejects Raman scattering or fluorescence caused by the interaction of the intense laser light with the glass of the optical fibre which delivers the laser light, passing only a monochromatic laser wavelength to the sample. Thirdly, it removes much of the laser wavelength which is back-scattered by the sample along with the desired Raman or other scattered wavelengths. Thus, the desired scattered wavelengths do not become confused in the return optical fibre with Raman scattering or fluorescence induced in the optical fibre by the laser wavelength, which as received from the sample is many times more intense than the desired signals. It also makes it easier to separate the desired wavelengths from the laser wavelength in the spectroscopic apparatus.

In some applications, it would be desirable to miniaturise such a probe. One example is where the probe is to be incorporated in an endoscope for medical examinations, where a maximum diameter of 2 mm or less may be desirable. The probes described in the Carrabba and Owen patents comprise numerous discrete components which must be assembled and aligned, making it impossible to achieve such miniaturisation.

SUMMARY OF THE INVENTION

The present invention, at least in preferred embodiments, seeks to provide a probe having fewer discrete components.

One aspect of the present invention provides a component for a spectroscopic probe, comprising a block of transparent material, having two opposed angled faces arranged for reflection of light from one to the other within the block. Preferably at least one of said angled faces has a reflecting or partially reflecting coating, e.g. a dichroic filter coating which reflects light of a first wavelength (or range of wavelengths) and transmits light of a second wavelength (or range of wavelengths).

In a second aspect, the present invention provides a spectroscopic probe comprising such a component.

In a third aspect, the invention provides a method of making a component for a spectroscopic probe, comprising the steps of taking a sheet of transparent material, coating at least one face of the sheet of transparent material with a reflecting or partially reflecting coating, e.g. a dichroic filter coating, and cutting said component from the sheet with a cut which is at an angle to said face, thereby producing an angled face with said coating in the resulting component.

The other angled face of the component (opposing the angled face with the dichroic coating) may be coated with a reflecting material, e.g. aluminium. Likewise, in the method according to the invention, the face of the sheet of transparent material which opposes the face with the dichroic coating may be coated with a reflecting material such as aluminium.

BRIEF DESCRIPTION OF THE DRAWINGS

Preferred embodiments of the present invention will now be described by way of example, with reference to the accompanying drawings, wherein.

DESCRIPTION OF PREFERRED EMBODIMENTS

Figure 1:
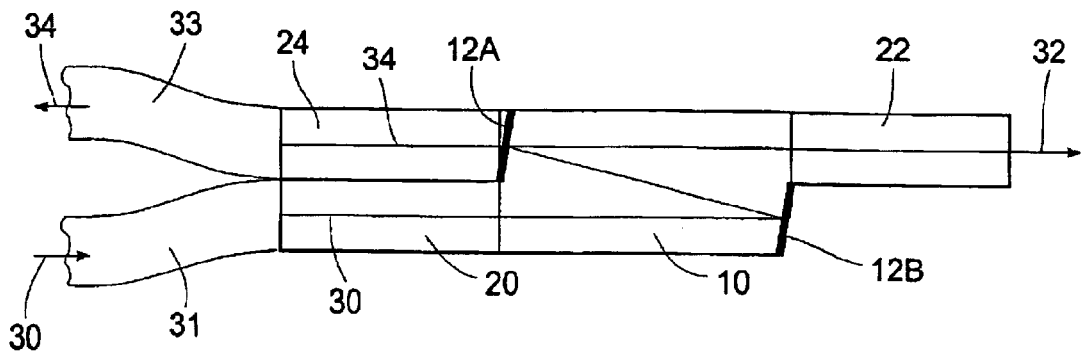
FIG. 1 is a side view of a spectroscopic probe.

FIG. 1 shows an embodiment of the present invention in which the component 10 is a monolithic substantially cuboid-shaped block of transparent material. An angled face 12A of the block 10 is coated with dielectric layers forming a notch or edge dichroic filter. An opposing angled face 12B is coated with a reflective layer, for example of aluminium. It could instead have the same coating as the face 12A.

A graded index (GRIN) lens 20 couples an incoming laser beam 30 from an input optical fibre 31 into the block 10. The laser beam 30 contains not only the laser wavelength but also scattered light (including Raman scattered light) from the passage of the beam through the optical fibre. It is reflected by the reflective coating 12B towards the face 12A.

The beam is then reflected by the dichroic filter layer on the face 12A. In the case of a notch filter, this acts to monochromate the beam by reflecting the laser wavelength and transmitting all other wavelengths. In the case of an edge filter, it removes scattered light on the Stokes side of the laser line.

If desired, one end of the GRIN lens 20 may be coated with dielectric layers forming a band pass filter, to monochromate the beam further.

The resulting monochromatic beam 32 is then passed to a sampling port, comprising a GRIN lens 22 which focuses the light on the sample to be analysed. Back-scattered light is collected by the lens 22 and passes back to the dichroic surface 12A. Where the lens 22 is a commercially available GRIN type, which is arranged such that its focal plane coincides with its end surface, the end surface may be cut or polished back. This alters the focal plane so that the light can be focused on the surface of the sample, or on sub-surface features of the sample.

The dichroic surface 12A reflects scattered light of the exciting laser wavelength collected by the lens 22, but transmits the desired Raman or fluorescent scattered light 34 into a GRIN lens 24. The lens 24 couples the scattered light 34 into a second, output optical fibre 33, which takes it to a remote spectroscopic apparatus for analysis.

The faces 12A,12B are preferably parallel to each other and the face 12A, in particular, is preferably angled at a low angle of incidence to the beams, such as 10°. This gives good performance with polarised light, and efficient separation of the laser wavelength from the desired Raman or fluorescent scattered light. However, other angles such as 45° are possible.

The arrangement of FIG. 1 reflects the incoming illuminating light at the filter face 12A, to fold it into the same optical path as the scattered light from the sample to the output fibre 33. Whilst that is the preferred arrangement, an inverse arrangement is also possible. In the inverse arrangement, the illuminating light is delivered via the fibre 33 and lens 24 and passes through the filter face 12A to the sample. The scattered Raman or fluorescent light is folded out of this optical path by reflection at the filter face 12A. The filter 12A needs to have the appropriate bandpass or edge transmission characteristic.

Figure 2:
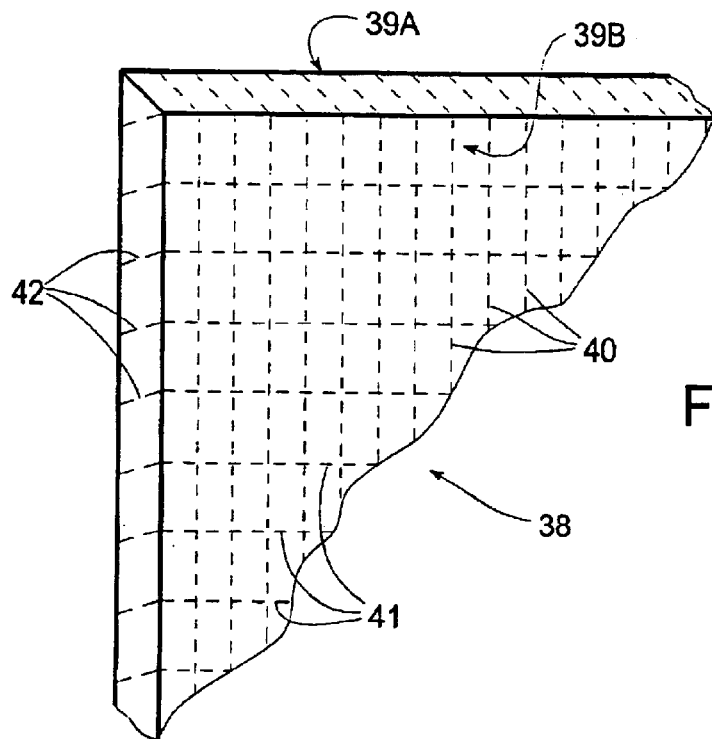
FIG. 2 is an isometric view of part of a sheet of transparent material for use in a method of manufacturing a component of the probe.

FIG. 2 shows a part 38 of a sheet of transparent material for use in manufacturing the probe component 10. The lower face 39A is coated with the dielectric layers forming the dichroic filter and the upper face 39B is coated with the reflective layer.

Broken lines 40 and 41 represent the directions along which the sheet 38 is cut using a diamond saw. The lines 41 do not run normal to the plane of the sheet but rather at an angle (e.g. 10°) as indicated by the broken lines 42.

Figure 3:
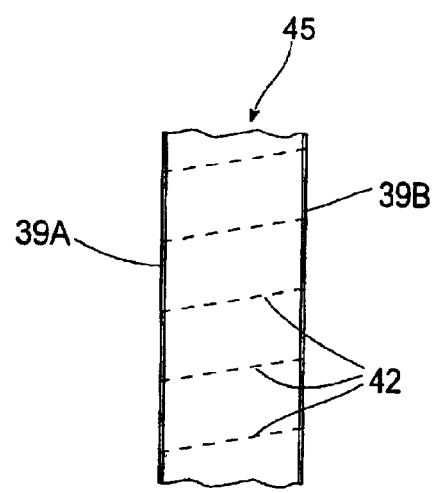
FIG. 3 shows a portion cut from the sheet of FIG. 2.

FIG. 3 illustrates (side-on) one of a plurality of portions 45 of the transparent sheet 38 after cutting along the lines 40.

Figure 4:
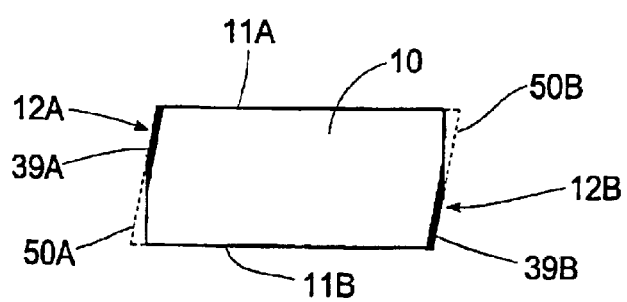
FIG. 4 shows a component of a spectroscopic probe cut from the portion of FIG. 3.

FIG. 4 shows the finished block 10 as in FIG. 1. The portions 45 are cut along the lines 41,42 to produce a plurality of individual blocks. Prism-shaped sections 50A and 50B are then removed from the blocks, e.g. by polishing, such that the polished faces are perpendicular to the long edges 11A and 11B of the block. This partially removes the coatings 39A,39B, so that they remain only on the faces 12A,12B as required.

The GRIN lenses 20,22,24 are then bonded to the block 10, e.g. with a cement of suitable optical quality.

As described above, blocks 10 have been produced by cutting the sheet 38 first along the lines 40, then along the lines 41,42. Of course, it is possible instead to cut first along the lines 41,42 and then along the lines 40.

Using the above method, we have successfully produced spectroscopic probes with diameters of 2 mm and less, suitable for use in an endoscope.

The use of GRIN lenses 20,22,24 is not essential. Conventional lenses (or compound groups of lenses) may be substituted.

One advantage of the probe described is that it can act confocally. The aperture of the fibre 33 acts in a similar manner to a confocal pinhole, so that only light from one focal plane of the sample is accepted and light from other planes is rejected. This gives depth selectivity.

A further possibility is to bundle a plurality of probes according to FIG. 1 together, in a single endoscopic instrument. This may be arranged to produce a two-dimensional image of the sample, which may be confocal. Or each probe may point in a different direction, e.g. in a hemi-spherical arrangement, to give a view over a wider area.

The miniature probes described may be used in numerous applications where conventional spectroscopic probes would be too large. In addition to endoscopes for in vivo medical and veterinary examinations, they can for example be used in boroscopes for examinations within working machinery and engines.

What is claimed is:

1. A spectroscopic probe, comprising:
   an optical input port for receiving illuminating light;
   a sampling port, for illuminating a sample with the illuminating light and collecting light scattered by the sample;
   an optical output port for outputting scattered light received from the sampling port; and
   a block of transparent material, having two opposed angled faces for reflection of light from one to the other within the block, light passing through the block between the optical input port, the sampling port and the optical output port;
   wherein the light between the sampling port and one of the input and the output ports is reflected between said opposed angled faces of the block.

2. A spectroscopic probe according to claim 1, including optical fibres connected to the input and output ports, for delivering the illuminating light and receiving the scattered light respectively.

3. A spectroscopic probe according to claim 1, wherein at least one of said angled faces has a reflecting or partially reflecting coating.

4. A spectroscopic probe according to claim 3, wherein said coating on at least one of the angled faces is a dichroic filter coating which reflects light of a first wavelength (or range of wavelengths) and transmits light of a second wavelength (or range of wavelengths).

5. A spectroscopic probe according to claim 3, wherein the other of said angled faces has a reflecting or partially reflecting coating.

6. A spectroscopic probe according to claim 1, wherein said ports comprise lenses.

7. A spectroscopic probe according to claim 6, wherein the lenses are GRIN lenses.

8. A component for a spectroscopic probe, comprising a block of transparent material having multiple faces, at least two of the faces are angled faces on sides of the block for reflection of light from one to the other within the block, and for reflecting light between a sampling port and an input or output port of the spectroscopic probe, and at least two other faces are connected at different angles to the angled faces on the sides of the block and are perpendicular to edges of the block.

9. A component according to claim 8, wherein at least one of said angled faces has a reflecting or partially reflecting coating.

10. A component according to claim 9, wherein said coating on at least one of the angled faces is a dichroic filter coating which reflects light of a first wavelength (or range of wavelengths) and transmits light of a second wavelength (or range of wavelengths).

11. A component according to claim 9, wherein the other of said angled faces has a reflecting or partially reflecting coating.

12. A method of making a component for a spectroscopic probe, the component comprising a block of transparent material, having at least one angled face for reflecting light;
   the method comprising the steps of:
   providing a reflective face on a sheet of transparent material; and cutting said component from the sheet of transparent material at an angle to said face, thereby producing said block with at least one angled face.

13. A method according to claim 12, wherein said face of the sheet is coated with a reflecting or partially reflecting coating, prior to the cutting step, whereby the angled face in the resulting component is provided with said coating.

14. A method according to claim 13, wherein the coating is a dichroic filter coating which reflects light of a first wavelength (or range of wavelengths) and transmits light of a second wavelength (or range of wavelengths).

15. A method according to claim 13, wherein an opposing face of the sheet is also coated with a reflecting or partially reflecting coating, prior to the cutting step, thereby producing a second angled face with a said coating in the resulting component, opposing the first-mentioned angled face.

16. A method according to claim 12, including the step of removing a prism-shaped section from the angled face of the block.

17. A spectroscopic probe, comprising:

an optical input port for receiving illuminating light;

a sampling port, for illuminating a sample with the illuminating light and collecting light scattered by the sample;

an optical output port for outputting scattered light received from the sampling port;

an optical fibre connected to the output port, for receiving and transmitting the scattered light to an external apparatus; and a block of transparent material, having two opposed angled faces for reflection of light from one to the other within the block, light passing through the block between the optical input port, the sampling port and the optical output port;

wherein the light between the sampling port and one of the input and the output ports is reflected between said opposed angled faces of the block.

* * * * *